(12) United States Patent
Yanniello et al.

(10) Patent No.: US 6,407,897 B1
(45) Date of Patent: Jun. 18, 2002

(54) NETWORK PROTECTOR WITH DIAGNOSTICS

(75) Inventors: Robert Yanniello, Asheville, NC (US); John R. Moffat, Greenwood, SC (US); Steven E. Meiners, Beaver Falls, PA (US); Joseph C. Engel, Monroeville, PA (US); Thomas J. Kenny, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/540,407

(22) Filed: Mar. 31, 2000

(51) Int. Cl.[7] .................................................. H02H 3/00
(52) U.S. Cl. ....................................................... 361/62
(58) Field of Search ............................... 761/62, 64, 78, 761/83, 85

(56) References Cited

U.S. PATENT DOCUMENTS

| 3,947,728 | A | | 3/1976 | Smith | .......................... 361/76 |
|---|---|---|---|---|---|
| 5,796,631 | A | * | 8/1998 | Iancu et al. | .................... 361/63 |
| 5,822,165 | A | * | 10/1998 | Moran | .......................... 361/78 |
| 5,892,645 | A | * | 4/1999 | Watanabe et al. | ............. 361/85 |
| 6,005,757 | A | * | 12/1999 | Schvach et al. | ............... 361/64 |

* cited by examiner

*Primary Examiner*—Jessica Han
*Assistant Examiner*—Pia Tibbits
(74) *Attorney, Agent, or Firm*—Martin J. Moran

(57) ABSTRACT

A network protector is provided with diagnostics which alert a utility of component problems in detail. Selected measurements are used to assess the condition of various components such as for example, main contact electrical resistance, a blown fuse, the availability of sufficient voltage for charging the springs which close the main contacts and adequate voltage for tripping the contacts open. These abnormal operating conditions are transmitted to a remote station at the utility so that proper maintenance can be efficiently provided.

21 Claims, 3 Drawing Sheets

NETWORK PROTECTOR WITH DIAGNOSTICS

FIELD OF THE INVENTION

This invention relates to network protectors which connect an electric power distribution network to multiple feeder buses. Such network protectors have a protective relay to disconnect the network from a feeder bus upon detection of reverse power flow out of the network to the feeder bus. More particularly, it relates to diagnostics for detecting abnormal operating conditions in the network protector and preferably to a system which reports such abnormal operating conditions to a remote station.

BACKGROUND INFORMATION

A low voltage secondary power distribution network consists of interlaced loops or grids supplied by two or more sources of power so that the loss of any one source will not result in an interruption of power. Such networks provide the highest level of reliability possible with conventional power distribution and are normally used to supply high-density load areas such as a section of a city, a large building or an industrial site. Each source is a medium voltage multiphase feeder supplying the network with three phase power and consisting of a multiphase bus, a switch and a transformer. A network protector connects the multiphase feeder bus to the multiphase network and consists of a circuit breaker and a control relay. The control relay senses the transformer and network voltages and line currents, and executes algorithms to initiate breaker tripping or closing action. Trip determination is based on detecting reverse power flow, that is, power flow from the network to the feeder.

Traditionally, the control relays have been electromechanical devices which trip the circuit breaker open upon detection of power flow in the reverse direction. Such relays have been provided with a recloser which closes the circuit breaker following a trip when conditions are favorable for forward current flow. The electromechanical network protector relays are being replaced by electronic relays. One type of electronic network protector relay mimics the action of the electromechanical relay by calculating power flow. Another type of electronic network protector relay uses sequence voltages and currents to determine direction of current flow for making tripping decisions. Sequence analysis upon which such relays are based generates three vector sets to represent a three-phase voltage or current: a positive sequence vector, a negative sequence vector, and a zero sequence vector. U.S. Pat. No. 3,947,728 discloses a sequence based network protector relay which uses the positive sequence current and positive sequence voltage vectors to make the trip decision. More recently, a digital sequence based network protector relay has been utilized. This relay digitizes the voltages and currents and uses the digitized values to calculate the sequence components. This relay also performs metering functions and can include a communication system for transmitting the metering data to a remote station for storage and analysis.

It is common for the network protectors to be located under ground where they are protected from moisture and other adverse conditions in a vault. If the circuit breaker cannot be maintained closed to provide power to the network, it is necessary to send out a repair crew. Often, the cause or existence of a problem is not known until the repair crew can make an inspection. This can delay correcting the problem. Some network protectors have indicators indicating the status of the device but this does not necessarily provide an indication of the cause of the problem.

There is a need for an improved network protector including one with diagnostics which can indicate the nature of a problem.

There is a further need for such an improved network protector which provides an indication of the problem at a remote location so that a crew dispatched to the faulty network protector does not have to perform an on-site analysis and can come prepared to correct the known problem.

SUMMARY OF THE INVENTION

These needs and others are satisfied by the invention which is directed to a network protector with diagnostic apparatus and to diagnostic apparatus for use with a network protector. More particularly, the diagnostic apparatus includes means measuring selected parameters, processing means processing the selected parameters to detect abnormal operating conditions in the network protector, and means generating an by output indicating the abnormal operating condition. Preferably, the abnormal operating condition is transmitted to a remote station by a communication system. Some of the diagnostic checks which can be performed include measurement of the electrical resistance of the separable contacts in the multiphase power circuit of the network protector. This test is performed using a first voltage detector provided in the control relay which measures the voltage across the separable contacts, and a multiphase current detector that measures current passing through the separable contacts in each phase. Processing means within the diagnostic apparatus then calculates the electrical resistance of the separable contacts from the voltage readings across the separable contacts and the current flowing through the contacts. If this electrical resistance is above a predetermined value, an abnormal contact resistance indication is generated. This abnormal operating condition indication can be presented at the network protector and/or can be communicated to the remote station over the communication system.

The multiphase current generated by the current detector can be used to detect a blown fuse in a phase of the power circuit through the circuit breaker. To this end, the processing means generates an indication of a blown fuse condition if the current through a phase of the multiphase power circuit of the network protector is zero while current is detected in at least one other phase.

Where the circuit breaker of the network protector includes an operating mechanism which is actuated by a trip solenoid to open the separable contacts, the diagnostic apparatus includes a second voltage detector which monitors the voltage available to operate the trip solenoid through monitoring the voltage across a set of normally open trip contacts. If this voltage is below a predetermined value indicative of insufficient voltage to trip the circuit breaker, a low trip voltage indication is generated for optional transmission to the remote station.

For a network protector which includes a charging motor for charging the operating mechanism, another voltage detector monitors the voltage across normally open close contacts which energize the motor when closed. As in the case of the trip solenoid, a low close voltage abnormal operating condition indication is generated if the voltage available across the normally open contacts is insufficient to initiate charging of the operating mechanism. When these normally open close contacts are closed to energize the motor, the voltage across the motor is measured. The diagnostic apparatus generates a low motor voltage indication when the voltage across the motor is below a certain value. In a unique arrangement, a common voltage detector monitors the voltage across the normally open contacts when these contacts are open and automatically switches to measuring the voltage across the motor when the normally open contacts closed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
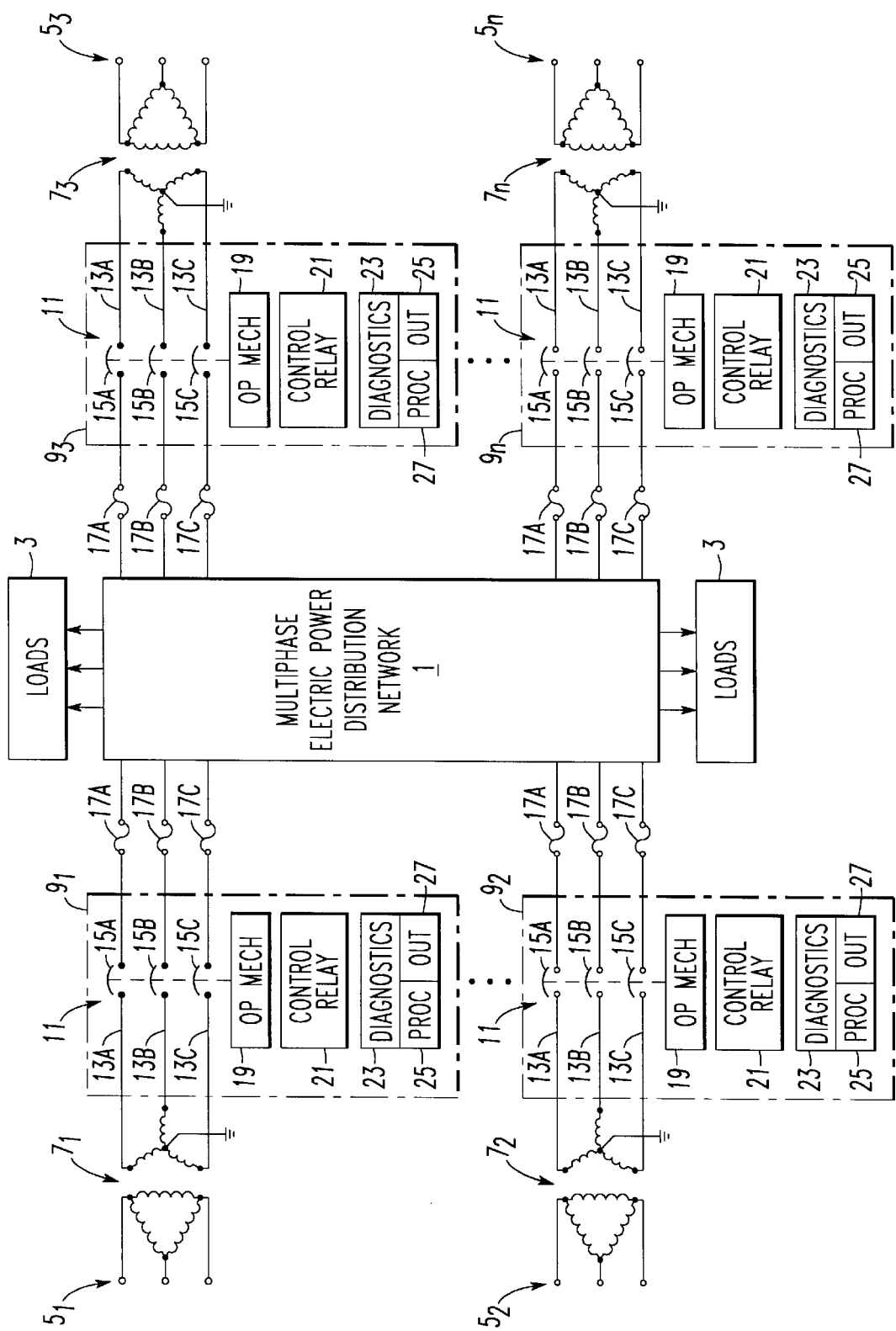
FIG. 1 is a schematic drawing of a low voltage electric power network fed by at least four feeder lines through network protectors incorporating the invention.

FIG. 1 illustrates a multiphase electric power distribution network 1 servicing various loads 3. The distribution network 1 is energized by multiple sources, such as for instance, the multiple three-phase feeder lines $5_1$–$5_n$ through associated transformers $7_1$–$7_n$. While the transformers $7_1$–$7_n$ have been shown as being delta-wye wound transformers, a wye-wye transformer could also be used. The multiphase electric power distribution network 1 is connected to each of the feeder lines $7_1$–$7_n$ through a network protector $9_1$–$9_n$.

Each network protector $9_1$–$9_n$ has a multiphase power circuit 11 which includes for each phase a power conductor 13A–13C connecting separable contacts 15A–15C and a fuse 17A–17C in series. The network protectors 9 further include an operating mechanism 19 which opens the separable contacts in all of the phases when actuated. A control relay 21 monitors the current flowing through the power conductors 13A–13C and actuates the operating mechanism 19 to open the separable contacts 15A–15C if reverse power flow, that is flow of power from the network to the feeder line, is detected. Such control relays are well known and can also include forward overcurrent protection. That is, excessive current flow into the network from the associated feeder line.

Figure 2:
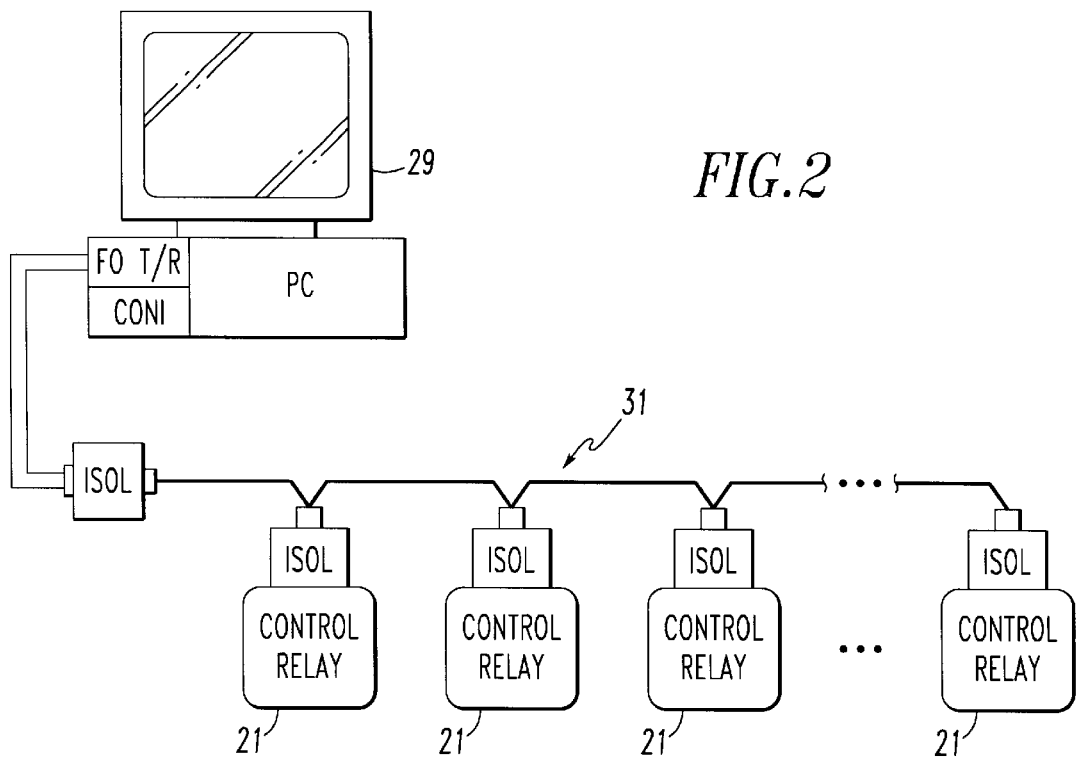
FIG. 2 is a schematic diagram of a system in which the network protectors for an electric power distribution network are linked to a remote station by a digital communication system.

In accordance with the invention, the network protectors 9 are also provided with diagnostic apparatus 23 which includes a processor 25 and a device for generating an output 27. The processor 25 can be implemented within the control relay 21. Also in accordance with the invention, the diagnostic apparatus 23 can include a remote station 29 connected to each of the network protectors by a communication network 31 as shown in FIG. 2. This arrangement allows the utility to monitor the operation of the network remotely. Presently, communication networks such as Cutler-Hammer's POWERNET™ Communication Network is used to access protector measurement data of interest. In accordance with the invention, this use could be expanded to communicate diagnostic data to the utility. The diagnostic apparatus utilizes the communication network interface of the control relay to report this diagnostic information.

Figure 3:
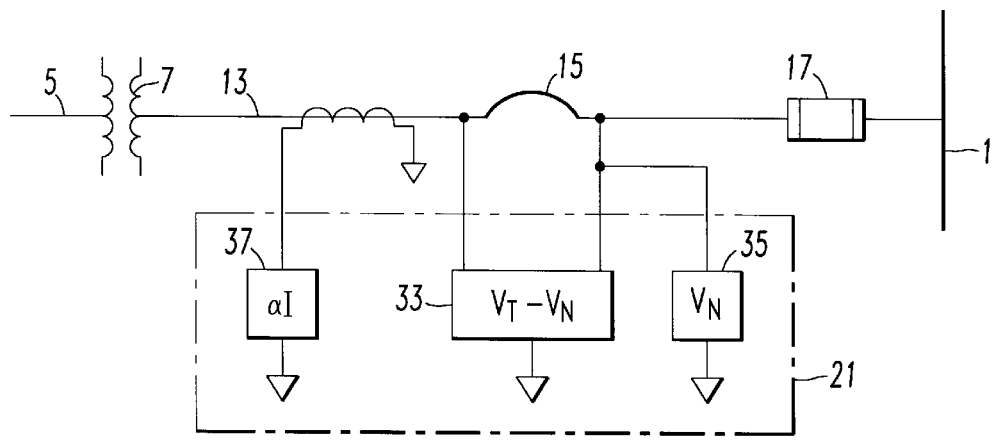
FIG. 3 is a single line schematic diagram illustrating portions of the network protector utilized to perform diagnostics for detecting abnormal electrical resistance of the separable contacts of the network protector and for identifying blown fuses.

Various diagnostic measurements can be performed at each network protector. One diagnostic measurement performed is the calculation of the electrical resistance of the separable contacts 15. FIG. 3 illustrates the voltage and current sensing circuitry which is part of the control relay. Only one phase is shown in FIG. 3 for clarity; however, similar measurements are made for each phase. A first voltage detector 33 measures the voltage across the separable contacts while an additional multiphase voltage detector 35 measures the voltage on the network side of the separable contacts. A current detector 37 measures the current flowing through the power conductor 13 and therefore through the separable contacts 15. These voltage detectors and the current detector are currently provided in the control relay for controlling opening and reclosing of the separable contacts. Measurements by the first voltage detector 33 and the current detector 37 are used by the invention to determine the electrical resistance which is calculated as the voltage across each separable contact divided by the separable contact current. The processor of the diagnostic apparatus makes this calculation and compares the result to a predetermined value for contact resistance. This calculation is only made when the current is above a selected value. Contact resistance which exceeds a second predetermined value is reported to the remote station as an abnormal operating condition.

The diagnostic apparatus 23 also checks for a blown fuse 17. If the current detected by the current detector 37 in any one of the power circuits 11 is zero while current is detected in at least one other phase, then a blown fuse indication is reported to the remote station as an abnormal operating condition.

Figure 4:
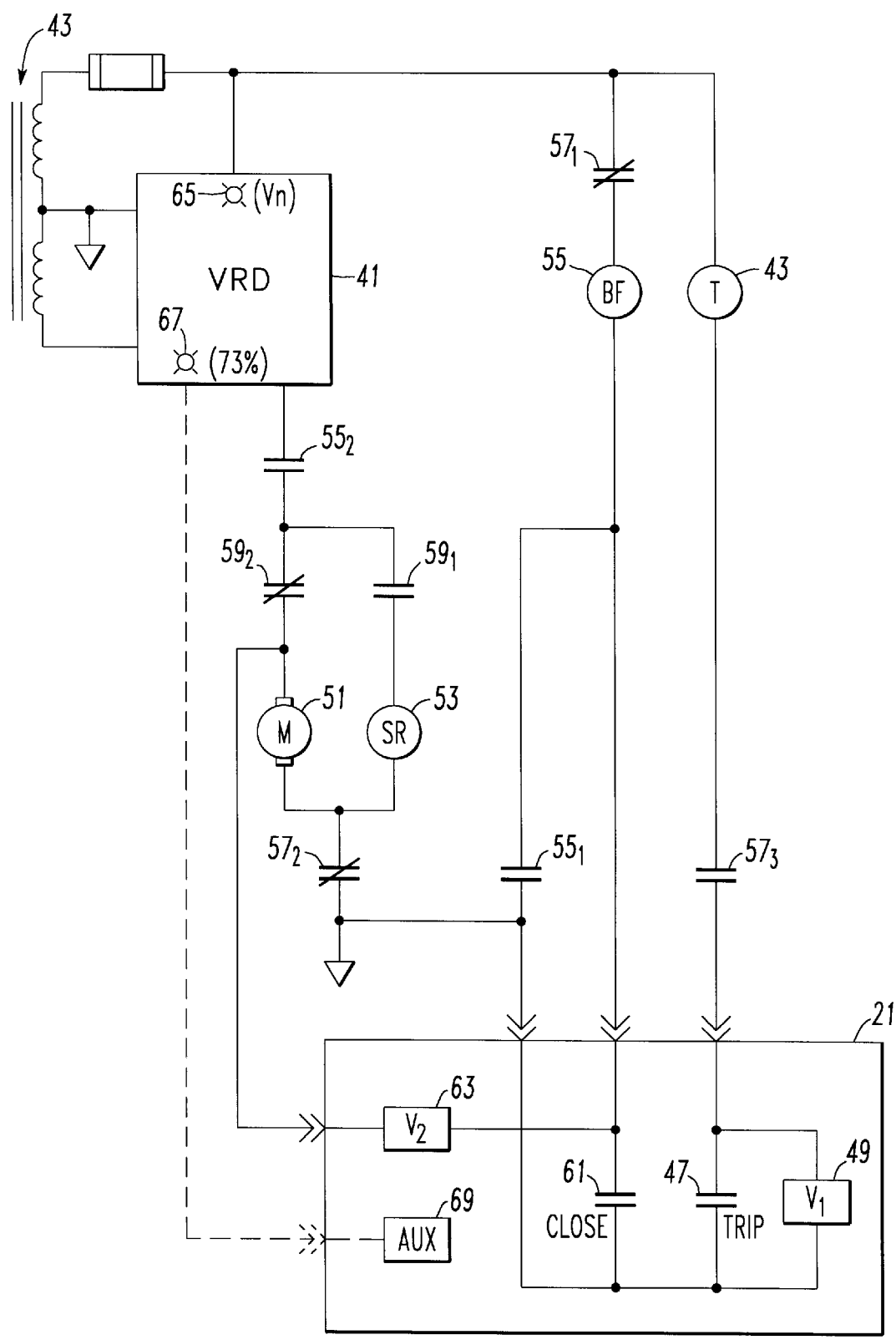
FIG. 4 is a schematic diagram of portions of the network protector and diagnostic apparatus which detects insufficient trip voltage, insufficient voltage to close the circuit breaker and insufficient close motor voltage.

Additional diagnostics performed are illustrated by reference to the portion of the control relay logic shown in FIG. 4. The operating mechanism 19 includes a trip solenoid which when energized causes opening of the separable contacts 15. The trip solenoid coil 43 is controlled by the series combination of auxiliary contacts $57_3$, which are closed when the separable contacts are closed, and normally open trip contacts 47 in the control relay 21. With the separable contacts 15 closed, if the control relay 21 detects a reverse current condition, the normally open trip contacts 47 are closed to actuate the operating mechanism through energization of the trip solenoid 43. It is important that sufficient voltage be available to energize the trip solenoid 43 to assure opening of the separable contacts 15. In accordance with the invention, the diagnostic apparatus 23 includes a third voltage detector 49 which monitors the voltage across the normally open trip contacts 47. If these contacts are open and the voltage detected by the detector 49 is less than a predetermined value, an abnormal trip voltage condition is reported to the remote station.

The operating mechanism 19 utilizes a large spring or springs (not shown) to close the contacts 15 as is well known. The spring(s) is(are) charged by a charging motor 51. The motor 51 is energized by the VRD 41 but only if the voltage on the network is above the required minimum value of 73% of the nominal network voltage. The operating mechanism 19 also includes a spring release relay 53 which, when energized, releases the spring to apply the stored energy to close the separable contacts 15. Sequencing of energization of the motor 51 and the spring release solenoid 53 is controlled by a BF relay 55 and its normally open contacts 55$_1$ and 55$_2$, by second auxiliary contacts 57$_1$ and 57$_2$ which are closed only when the separable contacts 15 are open, and normally open spring charged contacts 59$_1$ and normally closed spring charged contacts 59$_2$ which are open and closed, respectively, when the spring is charged. The close sequence is initiated by the control relay through normally open close contacts 61. The control relay only closes these contacts 61 when there is sufficient voltage on the feeder line and the feeder line voltage is in proper phase relationship with the network voltage. As the contacts 57$_1$ will be closed with the separable contacts open, closing of the close contacts 61 by the control relay 21 results in energization of the BF relay which is maintained energized by the contacts 55$_1$. With the separable contacts 15 open and the spring uncharged, the contacts 57$_2$ and 59$_1$ will be closed so that upon the closing of the BF contacts 55$_2$ the motor 51 is energized to charge the spring. When the spring is fully charged, the normally closed contacts 59$_2$ will open and the normally open contacts 59$_1$ will close to energize the spring release solenoid 53 to close the separable contacts 15.

Again, it is important that sufficient voltage is available to operate the motor and the spring release solenoid. Hence, in accordance with the invention, another voltage detector 63 is provided to measure the voltage available prior to the initiation of the closing sequence and to measure the voltage across the motor when it is energized. In accordance with the invention, a single voltage detector 63 is utilized to provide both of these measurements. Prior to initiation of the closing sequence, the voltage detector 63 measures the voltage across the normally open close contacts 61 to ground through the unenergized motor 51 and the normally closed second auxiliary contacts 57$_2$. During the closing sequence, the right hand side of the voltage detector 63 is connected to ground at first through the closed close contacts 61 and then through the BF contacts 55$_1$. The left side of the voltage detector 63 is then connected to the hot side of the motor 51 to thereby measure the voltage across the motor. If the voltage across the close contacts 61 when these contacts are open is below a selected value, an abnormal close voltage indication is generated and transmitted to the remote station. If the voltage across the motor 51 is below a predetermined value when the motor is energized, an abnormal charge motor voltage indication is generated and transmitted to the remote station.

As can be appreciated, the diagnostics provided by the invention permit the utility to analyze the operation of the network protector and determine the probable cause of abnormal operation remotely so that when a repair crew is dispatched they will know what the problem is and be prepared to take appropriate action. It will be evident that additional diagnostic functions could be performed and reported to the remote station. It should also be appreciated that the abnormal conditions can be made accessible at the network protector to the maintenance crew. This would be in addition to various status indications already provided at the network protector. For instance, as can be seen in FIG. 4, the VRD 41 is provided with an LED 65 indicating the presence of trip voltage and another LED 67 indicating that the network voltage is at least 73% of nominal voltage so that closing is possible. This latter indication can be provided to the control relay by way of auxiliary contacts 69 for reporting the condition to the remote station.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A network protector connecting a multiphase feeder line to a multiphase electric power distribution network comprising:

a multiphase power circuit comprising separable contacts for connecting each phase of the multiphase feeder line to an associated phase of the multiphase electric power distribution network;

an operating mechanism for opening and closing said separable contacts when actuated;

a control relay monitoring current through said separable contacts and actuating said operating mechanism to open said separable contacts in response to predetermined current conditions; and diagnostic apparatus comprising means measuring selected parameters, processing means processing said selected parameters to detect abnormal operating conditions in said network protector and means generating an output indicating said abnormal operating conditions.

2. The network protector of claim 1 wherein said diagnostic apparatus includes a remote station and a communication system communicating said abnormal operating conditions to said remote station.

3. The network protector of claim 2 wherein said processing means comprises means processing selected parameters to detect abnormal electrical resistance of said separable contacts.

4. The network protector of claim 3 wherein said control relay includes a multiphase first voltage detector measuring voltage on each phase on the multiphase feeder line across said separable contacts and a multiphase current detector measuring current through said separable contacts in each phase, and wherein said processing means uses said voltage across said separable contacts measured by said first voltage detector for each phase and the current detected by the current detector for each phase to determine electrical resistance of said separable contacts in each phase.

5. The network protector of claim 4 wherein said diagnostic apparatus includes a remote station and a communication system communicating said electrical resistance of said separable contacts in each phase to said remote station.

6. The network protector of claim 1 wherein said multiphase power circuit includes a fuse in series with said separable contacts in each phase, and wherein said processing means comprises means processing selected parameters to detect a blown fuse.

7. The network protector of claim 6 wherein said control relay includes a multiphase current detector detecting current through said separable contacts in each phase of said multiphase power circuit and wherein said processing means detects a blown fuse in response to no current through a phase of said multiphase power circuit while current is detected in at least one other phase of the multiphase power circuit.

8. The network protector of claim 7 wherein said diagnostic apparatus includes a remote station and a communication system communicating said blown fuse condition to said remote station.

9. The network protector of claim 1 wherein said operating mechanism includes a trip solenoid actuating said operating mechanism when energized from said multiphase electric power distribution network, said processing means monitoring voltage available to energize said trip solenoid and generating an abnormal trip voltage indication when the voltage available for energizing said solenoid is below a selected value.

10. The network protector of claim 9 wherein said control relay includes a set of normally open trip contacts connecting said trip solenoid to energize said trip solenoid, and said diagnostic apparatus comprises a second voltage detector monitoring voltage across said normally open trip contacts and generating an indication of an abnormal trip voltage condition when said normally open trip contacts are open and said voltage across said normally open trip contacts is less than said selected value.

11. The network protector of claim 10 wherein said diagnostic apparatus includes a remote station and a communication system communicating said abnormal trip voltage condition to said remote station.

12. The network protector of claim 1 wherein said operating mechanism includes a charging motor and said diagnostic apparatus includes another voltage detector measuring voltage across said charging motor, and said processing means includes means generating an abnormal motor voltage indication when said voltage across said charging motor is less than a predetermined value.

13. The network protector of claim 12 wherein said operating mechanism further includes a motor relay energizing said charging motor and normally open close contacts connecting said motor relay for energization when closed, said another voltage detector monitoring voltage across said normally open close contacts when said normally open close contacts are open and monitoring voltage across said charging motor when said normally open close contacts are closed, and said processing means generates an abnormal motor voltage indication when the voltage across said charging motor is less than a first predetermined value and when said voltage across said normally open close contacts is less than a second predetermined value.

14. The network protector of claim 13 wherein said diagnostic apparatus includes a remote station and a communication system communicating said abnormal motor voltage indication to said remote station.

15. The network protector of claim 1 wherein said operating mechanism includes a charging motor, a motor relay for energizing said charging motor and normally open close contacts connecting said motor relay for energization when closed, said diagnostic apparatus including another voltage detector monitoring voltage across said normally open close contacts, and said processing means generates an abnormal motor voltage indication when said normally open close contacts are open and said voltage across said normally open close contacts is less than a predetermined value.

16. The network protector of claim 15 wherein said diagnostic apparatus includes a remote station and a communication system transmitting said abnormal motor voltage signal to said remote station.

17. Apparatus for monitoring the operation of a network protector connecting a multiphase feeder line to a multiphase network including a phase conductor for each phase with separable contacts, an operating mechanism, a control relay monitoring current and actuating said operating mechanism to open said separable contacts in response to predetermined current conditions, said apparatus comprising:
    diagnostic apparatus monitoring said network protector for abnormal operating conditions and in response thereto generating an abnormal operating condition indication;
    a remote station; and
    a communication system communicating said abnormal operating condition indication to said remote station.

18. The apparatus of claim 17 for a network protector which includes a multiphase first voltage detector measuring feeder voltage on the multiphase feeder line across said separable contacts, and a multiphase current detector detecting current through each of said separable contacts, and wherein said diagnostic apparatus comprises processing means determining the electrical resistance of said separable contacts for each phase from said voltage across said current through said separable contacts and generating an abnormal contact resistance indication as said abnormal operating condition indication for separable contacts of any phase having an electrical resistance more than a predetermined value.

19. The apparatus of claim 17 for a network protector in which said operating mechanism includes a trip solenoid and a set of normally open trip contacts which are closed to energize said trip solenoid, wherein said diagnostic apparatus comprises a second voltage detector measuring voltage across said normally open trip contacts and processing means generates an abnormal trip voltage indication as said abnormal operating condition indication when said normally open trip contacts are open and said voltage across said normally open trip contacts is less than a selected value.

20. The apparatus of claim 19 for a network protector in which said operating mechanism includes normally open close contacts, wherein said diagnostic apparatus includes another voltage detector measuring voltage across said normally open close contacts and said processing means generates an abnormal close voltage indication as said abnormal operating condition indication when said normally open close contacts are open and said voltage is less than a predetermined value.

21. The apparatus of claim 20 for a network protector in which the operating mechanism also includes a motor and said another voltage detector detects voltage across said motor when said normally open close contacts are closed, wherein said processing means generates an abnormal motor voltage indication as said abnormal operating condition indication when said voltage across said motor is below a certain value.

* * * * *